United States Patent
Cao et al.

(10) Patent No.: US 11,102,336 B2
(45) Date of Patent: *Aug. 24, 2021

(54) MULTI-PROTOCOL FRAME FORMAT

(71) Applicant: Marvell World Trade Ltd., St. Michael (BB)

(72) Inventors: Rui Cao, Fremont, CA (US); Hongyuan Zhang, Fremont, CA (US); Prashant Sharma, Santa Clara, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 87 days.

This patent is subject to a terminal disclaimer.

(21) Appl. No.: 16/578,478

(22) Filed: Sep. 23, 2019

(65) Prior Publication Data
US 2020/0092403 A1 Mar. 19, 2020

Related U.S. Application Data

(62) Division of application No. 16/561,047, filed on Sep. 5, 2019.

(Continued)

(51) Int. Cl.
*H04L 29/06* (2006.01)
*H04L 27/26* (2006.01)
*H04L 5/00* (2006.01)

(52) U.S. Cl.
CPC ............ *H04L 69/24* (2013.01); *H04L 5/0048* (2013.01); *H04L 27/261* (2013.01); *H04L 69/22* (2013.01)

(58) Field of Classification Search
CPC ..... H04L 69/24; H04L 27/261; H04L 5/0048; H04L 69/22; H04L 69/18; H04L 27/2602; H04W 4/46; H04W 72/042; H04W 16/14
See application file for complete search history.

(56) References Cited

U.S. PATENT DOCUMENTS

2016/0127948 A1 5/2016 Azizi et al.
2017/0257835 A1* 9/2017 Wu .................. H04L 5/005
(Continued)

OTHER PUBLICATIONS

IEEE Standard 802.11p, "IEEE Standard for Information technology—Local and metropolitan area networks—Specific equirements—Part 11: Wireless LAN Medium Access Control (MAC) and Physical Layer (PHY) Specifications Amendment 6: Wireless Access in Vehicular Environments", pp. 1-51, Jul. 2010.
(Continued)

*Primary Examiner* — Dady Chery

(57) ABSTRACT

Communication apparatus includes a transceiver configured to transmit and receive signals over a wireless channel in accordance with both a first communication protocol and a second communication protocol. The second communication protocol is backward-compatible with the first communication protocol, while defining an enhanced communication bandwidth that is at least twice the nominal communication bandwidth of the first communication protocol. A communication controller generates data frames for transmission by the transceiver, including frame headers in a header format that is compatible with both the first communication protocol and the second communication protocol, such that the frame headers are transmitted within the nominal communication bandwidth. The data frames that are transmitted in accordance with the second communication protocol have first and second frame headers that are transmitted in parallel in respective first and second sub-bands of the enhanced communication bandwidth.

8 Claims, 3 Drawing Sheets

Related U.S. Application Data

(60) Provisional application No. 62/823,507, filed on Mar. 25, 2019, provisional application No. 62/730,959, filed on Sep. 13, 2018.

(56) References Cited

U.S. PATENT DOCUMENTS

2019/0222680 A1 7/2019 Chu et al.
2019/0223253 A1 7/2019 Sakamoto et al.
2019/0342796 A1* 11/2019 Lepp ............... H04W 28/22

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.

IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, Dec. 2013.

IEEE Standard 802.11a (2003), "IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band", pp. 1-92, Jun. 2003.

IEEE Std 802.11g™, "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band", pp. 1-78, Jun. 27, 2003.

IEEE 802.11b-1999/Cor Jan. 2001—IEEE Standard for Information Technology—Telecommunications and Information Exchange Between Systems—Local and Metropolitan Networks—Specific Requirements—Part 11: Wireless LAN Medium Access Control (MAC) and Physical Layer (PHY) Specifications: Higher Speed Physical Layer (PHY) Extension in the 2.4 GHz Band—Corrigendum 1, pp. 1-23, 2001.

Cao et al., U.S. Appl. No. 16/561,047, filed Sep. 5, 2019.
Naik et al., "IEEE 802.11bd & 5G NR V2X: Evolution of Radio Access Technologies for V2X Communications", pp. 1-12, Mar. 26, 2019.
Chu et al., U.S. Appl. No. 16/568,287, filed Sep. 12, 2019.
International Application # PCT/IB2019/057476 dated Nov. 25, 2019.

* cited by examiner

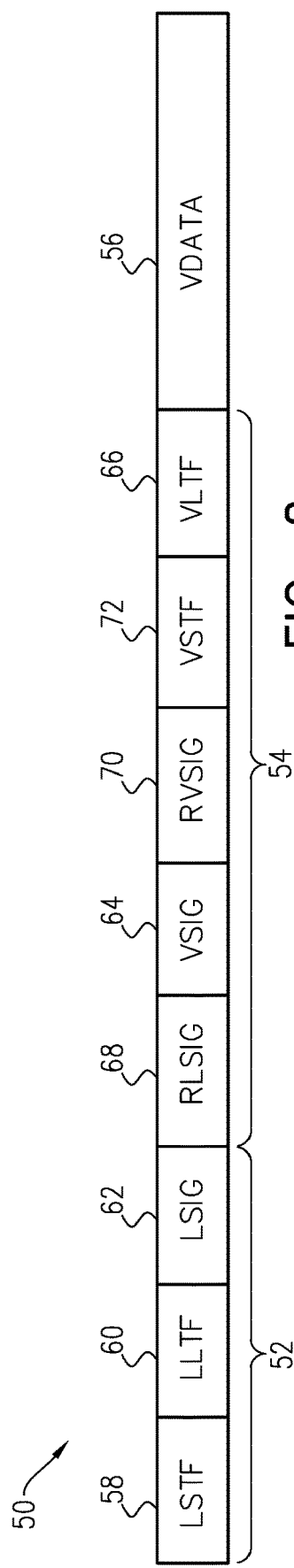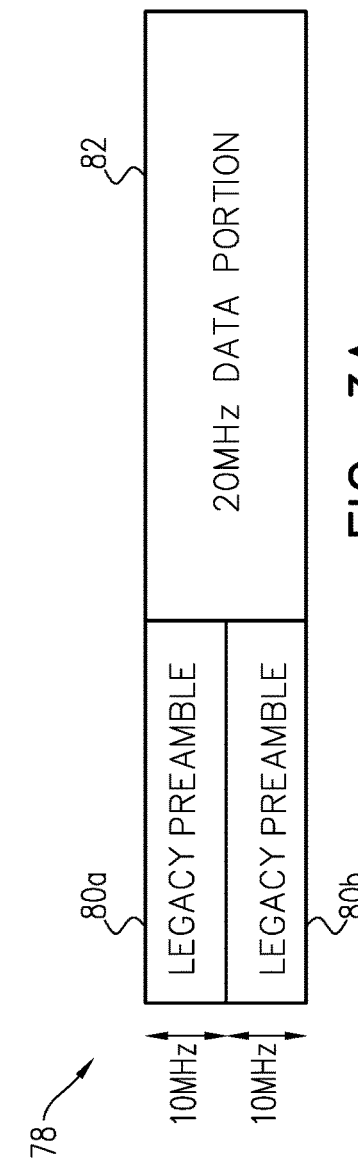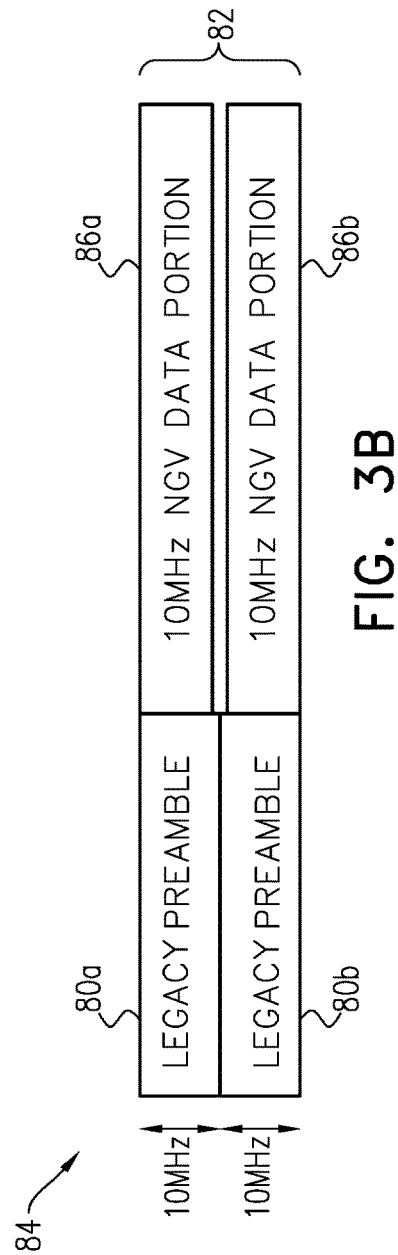

MULTI-PROTOCOL FRAME FORMAT

CROSS-REFERENCE TO RELATED APPLICATION

This application is a division of U.S. patent application Ser. No. 16/561,047, filed Sep. 5, 2019, which claims the benefit of U.S. Provisional Patent Application 62/730,959, filed Sep. 13, 2018, and U.S. Provisional Patent Application 62/823,507, filed Mar. 25, 2019. All of these related applications are incorporated herein by reference.

FIELD OF THE INVENTION

The present invention relates generally to communication networks, and particularly to methods and apparatus for data communications in vehicular environment.

BACKGROUND

Data communications to and from traveling vehicles have attracted increasing attention in the communication and automotive industries. This attention has led to the development of the IEEE 802.11p amendment to the 802.11 wireless local area network (WLAN) family of standards. IEEE 802.11p was defined to add wireless access in vehicular environments (WAVE), and specifies enhancements to the basic 802.11 standard that are useful in supporting Intelligent Transportation System (ITS) applications. The specific features of the 802.11p standard are described in IEEE Standard 802.11p™-2010, published by the IEEE Computer Society (New York, N.Y., 2010).

Advances in wireless technologies since the adoption of the 802.11p standard have led to the need for updates to the standard, for example for higher throughput, better reliability and efficiency, and extended communication range. For this purpose, the Next Generation V2X Study Group (NGV SC) was established in 2018 to develop the IEEE 802.11bd specification. (The term "V2X" refers to "vehicle-to-everything" communication, in which information is passed between a vehicle and any other entity that may affect the vehicle, including other vehicles.) The 802.11bd specification will support enhanced V2X technologies, while maintaining backward compatibility with 802.11p.

U.S. Patent Application Publication 2019/0222680, whose disclosure is incorporated herein by reference, describes a method, performed at a first communication device, for transmitting a physical layer (PHY) protocol data unit (PPDU) is described. An initiating PPDU is received from a second communication device. The initiating PPDU has a PHY header that indicates a first PPDU format of the initiating PPDU and a PPDU format field that indicates a second PPDU format of a responding PPDU to be transmitted in response to the initiating PPDU. The responding PPDU is generated using the second PPDU format. The responding PPDU is transmitted in response to the initiating PPDU.

SUMMARY

Embodiments of the present invention that are described hereinbelow provide improved methods and apparatus for communications, particularly in vehicular environments.

There is therefore provided, in accordance with an embodiment of the invention, communication apparatus, including a transceiver configured to transmit and receive signals over a wireless channel in accordance with both a first communication protocol and a second communication protocol. The first communication protocol defines a nominal communication throughput and a nominal range. The second communication protocol is backward-compatible with the first communication protocol. The second communication protocol has a first variant having an extended communication throughput, which is greater than the nominal communication throughput, and a second variant having an extended range, which is greater than the nominal range. A communication controller is configured to generate data frames for transmission by the transceiver, including frame headers in a header format that is compatible both with the first communication protocol and with both the first and second variants of the second communication protocol. The header format defines first fields having respective first values provided to support the first variant and second fields having respective second values provided to support the second variant.

In some embodiments, the first communication protocol defines a set of legacy header fields, and the communication controller is configured to generate the frame headers such that the first and second fields both include a non-legacy signal field, in addition to the set of legacy header fields, the non-legacy signal field having at least a first value indicative of the first variant and a second value indicative of the second variant. In a disclosed embodiment, the legacy header fields include a legacy signal (LSIG) field, and the communication controller is configured to insert the non-legacy signal field after the LSIG field in the header format.

Additionally or alternatively, the first communication protocol defines a set of legacy header fields including a legacy signal (LSIG) field, and the communication controller is configured to generate the frame headers such that the header format includes a repeated LSIG field following the set of legacy header fields.

In further embodiments, the first communication protocol defines a set of legacy header fields that are to be transmitted with a first gain, and the communication controller is configured to generate the frame headers by applying a second gain, greater than the first gain, in transmission of at least one of the legacy header fields. In one embodiment, the at least one of the legacy header fields to which the second gain is applied includes a training field. Typically, the communication controller is configured to apply the second gain in generating the data frames for transmission in accordance with the second variant of the second communication protocol. In a disclosed embodiment, the communication controller is configured, after applying the second gain to the at least one or the legacy header fields in a given data frame, to apply the first gain in transmitting a payload of the given data frame.

In a disclosed embodiment, the first communication protocol is an IEEE 802.11p protocol, and the second communication protocol is an IEEE 802.11bd protocol.

There is also provided, in accordance with an embodiment of the invention, a method for communication, which includes providing a transceiver that, is capable of transmitting and receiving signals over a wireless channel in accordance with both a first communication protocol and a second communication protocol. The first communication protocol defining a nominal communication throughput and a nominal range. The second communication protocol is backward-compatible with the first communication protocol. The second communication protocol has a first variant having an extended communication throughput, which is greater than the nominal communication throughput, and a second variant having an extended range, which is greater than the nominal range. Data frames are generated for transmission by the transceiver, including frame headers in a header format that is compatible both with the first communication protocol and with both the first and second variants of the second communication protocol. The header format defines first fields having respective first values provided to support the first variant and second fields having respective second values provided to support the second variant.

There is additionally provided, in accordance with an embodiment of the invention, communication apparatus, including a transceiver configured to transmit and receive signals over a wireless channel in accordance with both a first communication protocol and a second communication protocol. The first communication protocol defines a nominal communication bandwidth. The second communication protocol is backward-compatible with the first communication protocol while defining an enhanced communication bandwidth, which is at least twice the nominal communication bandwidth. A communication controller is configured to generate data frames for transmission by the transceiver, including frame headers in a header format that is compatible with both the first communication protocol and the second communication protocol, such that the frame headers are transmitted within the nominal communication bandwidth, and the data frames that are transmitted in accordance with the second communication protocol have first and second frame headers that are transmitted in parallel in respective first and second sub-bands of the enhanced communication bandwidth.

In some embodiments, the data frames include payloads including data symbols, and the communication controller is configured to cause the transceiver to modulate the data symbols over the nominal communication bandwidth in the data frames that are transmitted in accordance with the first communication protocol, and to modulate the symbols over the enhanced communication bandwidth in the data frames that are transmitted in accordance with the second communication protocol.

Alternatively, the communication controller is configured to cause the transceiver to modulate the data symbols over the nominal communication bandwidth in the data frames that are transmitted in accordance with the first communication protocol, and to cause the transceiver to modulate first symbols in the payloads over the first sub-band and second symbols in the payloads, different from the first symbols, over the second sub-band in the data frames that are transmitted in accordance with the second communication protocol.

There is further provided, in accordance with an embodiment of the invention, a method for communication, which includes providing a transceiver that is capable of transmitting and receiving signals over a wireless channel in accordance with both a first communication protocol and a second communication protocol. The first communication protocol defines a nominal communication bandwidth. The second communication protocol is backward-compatible with the first communication protocol while defining an enhanced communication bandwidth, which is at least twice the nominal communication bandwidth. Data frames are generated for transmission by the transceiver, including frame headers in a header format that is compatible with both the first communication protocol and the second communication protocol, such that the frame headers are transmitted within the nominal communication bandwidth. In the data frames that are transmitted in accordance with the second communication protocol, first and second frame headers in parallel in respective first and second sub-bands of the enhanced communication bandwidth.

The present invention will be more fully understood from the following detailed description of the embodiments thereof, taken together with the drawings in which:

BRIEF DESCRIPTION OF THE DRAWINGS

FIG. 2 is a block diagram that schematically illustrates a data frame transmitted over a wireless channel, in accordance with an embodiment of the invention;

FIGS. 3A and 3B are block diagrams that schematically illustrate data frames transmitted over a wireless channel, in accordance with further embodiments of the invention.

DETAILED DESCRIPTION OF EMBODIMENTS

Figure 1:
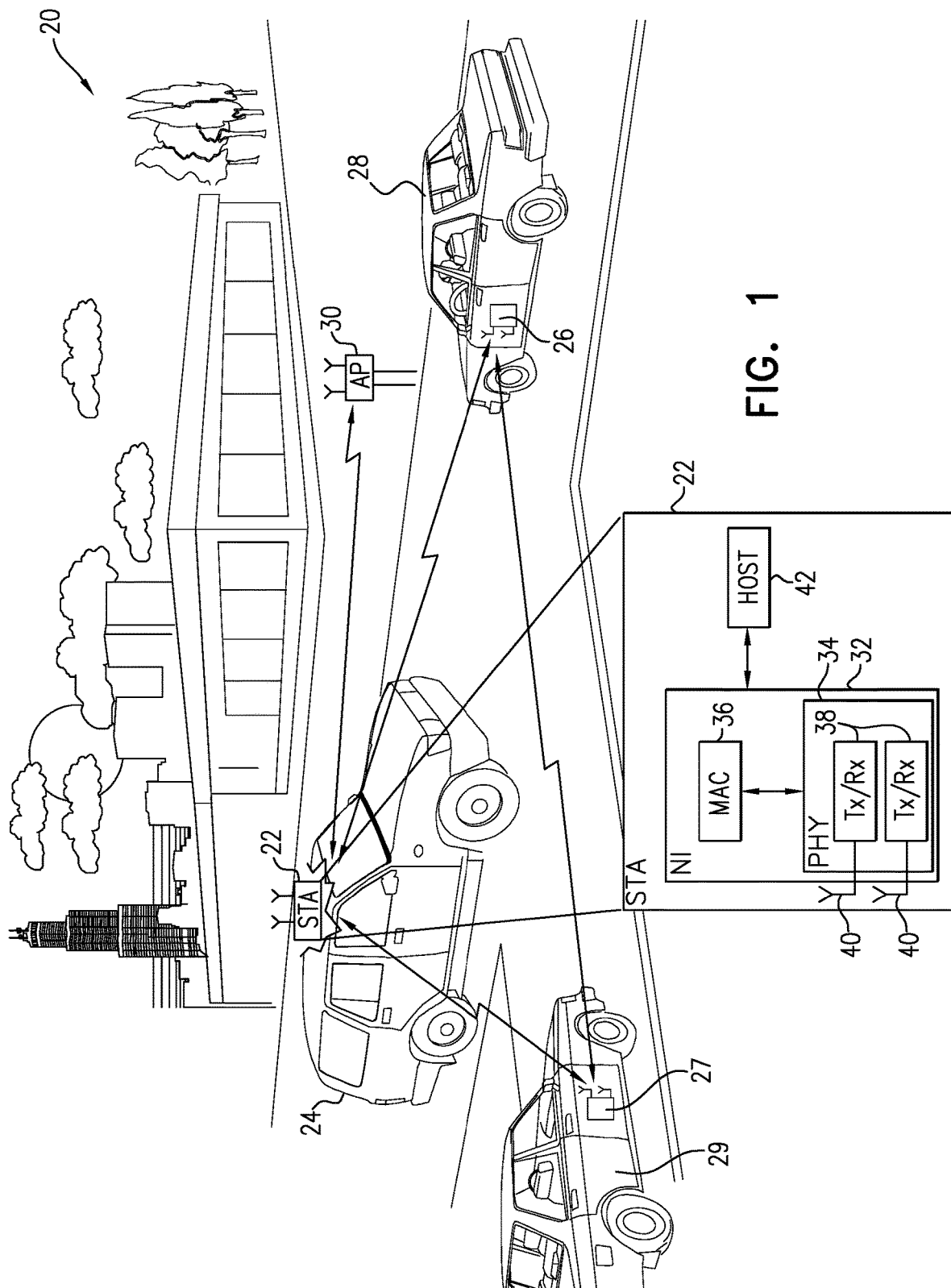
FIG. 1 is a schematic, pictorial illustration of a communication system, in accordance with an embodiment of the invention.

As advanced wireless communication stations are deployed, such as NGV stations, such stations will often find themselves in environments that contain both other NGV stations and legacy stations, and specifically legacy stations operating in accordance with the IEEE 802.11p standard noted above. For this reason, NGV protocols, such as the IEEE 802.11bd standard, are designed to be backward-compatible with legacy standards. NGV stations will be able to take advantage of the advanced compatibilities that NGV standards have to offer only after ascertaining that their neighboring stations are also NGV stations and are thus capable of supporting NGV communications.

The IEEE 802.11p standard defines a nominal communication throughput and a nominal range for communication over a wireless channel. The proposed IEEE 802.11bd standard supports a number of variants, including an extended-throughput variant, which supports increased communication data rates, and an extended-range variant, which enables communication coverage over a larger range of distances. The extended throughput and range are greater than the nominal throughput and range of legacy (IEEE 802.11p) stations, and call for signaling in the PHY header of the IEEE 802.11bd frames that can support these enhanced capabilities, while still satisfying the objective of maintaining backward compatibility with the IEEE 802.11p standard.

In some embodiments described herein, NGV-compatible stations provide signaling support for enhanced capabilities using a new PHY header format, which is backward-compatible with legacy PHY header formatting. This new format may include modifications to certain fields in the legacy PHY header, as well as the addition of new fields in an NGV PHY header, following the legacy PHY header. (The PHY header is equivalently referred to as the preamble, and a PHY data frame is equivalently referred to as a PPDU or data packet.) The same header format supports both the extended-throughput and extended-range variants, by appropriate choice of the field contents in the PHY headers.

A communication controller in an NGV-compatible station generates data frames for transmission by the transceiver of the station by setting the appropriate values of the PHY header fields, including different, respective values for different NGV variants. The field values set by the controller may include not only the data symbols that are inserted in the various header fields, but also the gain that is to be applied by the transceiver in transmitting the fields. This gain boost is useful particularly (though not exclusively) in increasing the transmission power of the training fields in the legacy header, in order to support the extended-range variant.

In some embodiments, the extended-throughput variant supports an enhanced communication bandwidth for NGV-compatible stations that is at least twice the nominal communication bandwidth offered by legacy stations operating in accordance with the IEEE 802.11p protocol. For example, a transceiver in an NGV-compatible station may modulate data frames over a bandwidth of 20 MHz, while legacy stations are limited to a bandwidth of 10 MHz. To maintain backward compatibility with the IEEE 802.11p standard, the communication controller in the NGV-compatible station generates frame headers that are transmitted, for both legacy and NGV frames, within the nominal, legacy communication bandwidth (10 MHz in the above example). When the data frames are to be transmitted in accordance with the NGV protocol at the enhanced bandwidth, the communication controller generates duplicate legacy headers, for transmission by the transceiver in parallel in respective sub-bands of the enhanced NGV bandwidth. Each such sub-band has a bandwidth equal to the legacy communication bandwidth. The frame payloads, following the legacy headers, may likewise be divided between the sub-bands, or they may alternatively be modulated over the entire, enhanced bandwidth.

FIG. 1 is a schematic, pictorial illustration of a communication system 20, in accordance with an embodiment of the invention. In the pictured scenario, a communication station (STA) 22 in a moving vehicle 24 communicates with one or more target receivers. For example, STA 22 may communicate with peer STAs 26 and 27 in other vehicles 28 and 29, and/or with fixed roadside infrastructure, such as an access point (AP) 30 (which is also considered a STA in protocols that do not require STAs to associate with a specific access point—sometimes referred to "association-less protocols"—such as IEEE 802.11p). Although the description that follows relates specifically to transmissions of data from STA 22 to a target receiver, in practice the communications in system 20 are bidirectional, meaning that STAs 26 and 27 and AP 30 may transmit data to STA 22 and one to another using the same methods and principles.

As shown in the inset in FIG. 1, STA 22 comprises a network interface (NI) 32, which comprises physical layer (PHY) and medium access control (MAC) interfaces 34 and 36, in accordance with the IEEE 802.11 specifications. PHY interface 34 comprises one or more radio transceivers 38, which are connected to antennas 40. In the pictured embodiment, PHY interface 34 comprises two such transceivers, each with its own antenna. Alternatively, larger or smaller numbers of transceivers and antennas may be used, with one or more antennas connected to each transceiver. The internal construction of STAs 26 and 27 and of AP 30 may be similar to that of STA 22. Typically, the components of PHY and MAC interfaces 34 and 36 are implemented in dedicated or programmable hardware logic circuits, on a single integrated circuit chip or a set of two or more chips.

Assuming STA 22 to be NGV-compatible, transceivers 38 in STA 22 are capable of transmitting and receiving signals over wireless channels in accordance with the requirements of both the IEEE 802.11p and IEEE 802.11bd standards. (As noted earlier, IEEE 802.11bd is backward-compatible with IEEE 802.11p.) Transceivers 38 thus provide capabilities that are supported by IEEE 802.11bd, such as extended throughput and extended range, but are not supported by IEEE 802.11p.

A host processor 42 passes data to network interface 32 for transmission over the air to target receivers, and receives incoming data from network interface 32. Host processor 42 typically comprises a programmable device, such as a microprocessor, microcontroller, and/or programmable gate array, along with a suitable memory and other resources (not shown), and is programmed in software or firmware to carry out various control and communication functions in STA 22. The software may be stored in tangible, non-transitory computer-readable media, such as a suitable RAM or ROM memory. Host processor 42 may be implemented together with the elements of network interface 32 in a single system-on-chip (SoC), or as a separate chip or chip set.

The components of STA 22 that are involved in encoding, decoding and framing data transmitted and received by transceivers 38, including setting parameters used in such operations, are referred to collectively herein as "control logic." The control logic typically includes both host processor 42 and components of network interface 32. The parameters that are set by the control logic, in the embodiments that are described herein, include the values of header fields that are used to signal both legacy and NGV features of each frame. Thus, in some embodiments, transceivers 38 transmit data frames that include frame headers compatible with IEEE 802.11p, while also including fields and values specified by IEEE 802.11bd to support NGV capabilities, including extended throughput and extended range.

When host processor 42 conveys outgoing data to network interface 32, MAC interface 36 encapsulates the outgoing data in MAC-layer data frames, referred to as MAC protocol data units (MPDUs). MAC interface 36 passes these MPDUs to PHY interface 34, which encapsulates them in physical-layer data frames (PPDUs, also referred to as packets). The data are encoded in each PPDU as a sequence of data symbols in accordance with a frequency-domain multiplexing scheme extending over a range of sub-carrier tones, for example the OFDM scheme specified by IEEE 802.11p, possibly with enhancements provided by IEEE 802.11bd. For NGV transmission, particularly in the extended-throughput variant, transceivers 38 may modulate the data symbols over an increased bandwidth relative to legacy operation, for example over 20 MHz for NGV transmission, by comparison with 10 MHz for legacy transmission.

FIG. 2 is a block diagram that schematically illustrates a data frame 50 transmitted over a wireless channel, in accordance with an embodiment of the invention. This embodiments, as well as the embodiments illustrated in the figures that follow, is described hereinbelow, for the sake of clarity and concreteness, with reference to the elements of system 20, and particularly the elements of STA 22, as shown in FIG. 1. Alternatively, however, the principles of these embodiments may be implemented, mutatis mutandis, in other system and hardware environments, as will be apparent to those skilled in the art after reading the present description. All such alternative implementations are considered to be within the scope of the present invention.

The format of data frame 50 is compatible with the IEEE 802.11p standard, and includes a legacy PHY header 52 and an NGV PHY header 54, followed by a payload 56. The payload in this example contains the MAC header and possibly upper-layer protocol headers, followed by the payload data and a frame check sequence (FCS). The arrangement of the fields of header 52 is compatible with the IEEE 802.11p protocol. Certain fields in header 52, however, can have values selected in accordance with the advanced capabilities of the STA transmitting data frame 50, for example capabilities provided by the IEEE 802.11bd standard; and the same format of header 52 can support both the extended-range and extended-throughput modes of operation.

Legacy PHY header 52 includes a legacy short training field (LSTF) 58, a legacy long training field (LLTF) 60, and a legacy signaling field (LSIG) 62.

NGV PHY header 54 includes an NGV signaling field (VSIG) 64 and an NGV long training field (VLTF) 66. Because VSIG 64 follows LSIG 62, it can be modulated using the OFDM tone plan specified by the symbol value in LSIG 62. The value of VSIG 64 can indicate whether frame 50 belongs to the extended-range or extended-throughput variant. Depending on the selected variant, VSIG 64 can include bits indicating information such as the modulation and coding scheme (MCS), coding type, error correction features, and the insertion of midambles within payload 56 for updating channel estimation at the receiver. For extended throughput, VSIG 64 may specify a high-order modulation scheme, whereas a lower-rate modulation may be specified for the extended range mode.

VLTF 66, which may use the same tone plan as payload 56, is processed by the receiver in order to re-estimate the channel with higher precision than is available from LLTF 60, in order to support the enhanced throughput or extended range option indicated by VSIG 64. In an alternative embodiment, VSIG 64 may follow VLTF 66 in order to increase the number of bits available for signaling in VSIG 64. As another alternative, VLTF 66 may be omitted from frame 50, while more OFDM tones are added to LLTF 60 and/or LSIG 62 in order to support extended channel estimation. In this alternative, in which additional OFDM tones are used, it may even be possible to provide sufficient information in LSIG 62 in order to omit VSIG 64 (though at the cost of being able to support only a small range of different modulation, coding, and error correction options).

Additionally or alternatively, NGV PHY header 54 may include a repeated LSIG field (RLSIG) 68 following the fields of legacy PHY header 52, and/or a repeated VSIG field (RVSIG) 70 following VSIG 64, as well as an NGV short training field (VSTF) 72. VSTF 72 can be useful in refining the gain, timing, and beamforming parameters applied by PHY interface 34; but VSTP 72 may alternatively be omitted, particularly since beamforming is often impractical in automotive environments. The repeated signaling fields RLSIG 68 and RVSIG 70 increase the amount of signaling information that the transmitter can convey to the receiver in each frame, thus supporting a wider choice of options for extended throughput and/or extended range. RLSIG 68 and RVSIG 70 may use the same tone mapping as LSIG 62 and VSIG 64, respectively; or they may use a different, interleaved tone mapping for purposes of channel diversity. Alternatively, RLSIG 68 and RVSIG 70 may be omitted, as well.

Additionally or alternatively, the communication control logic in STA 22 may selectively increase, for a period of time, the gain that transceivers 38 apply in transmission of certain fields in legacy PHY header 52 in frame 50, relative to the nominal gain that is applied in transmission of legacy frames in accordance with the IEEE 802.11p standard. For example, the gain applied to LSTF 58 and/or LLTF 60 may be increased in order to enhance detection by the receiver of legacy PHY header 52. The gain of certain fields in NGV PHY header 54, such as VLTF 66, may be increased, as well. The gains may be boosted, for example, by increasing the digital signal values that are input to the analog front end of the transmitters in transceivers 38.

The boosted gains of the training fields can be especially useful in improving the precision of channel estimation, particularly when transmitting frames over long distances in accordance with the extended-range variant of the NGV protocol. Additionally or alternatively, the gain of the signaling fields, LSIG 62 and/or VSIG 64, may be increased in order to increase the amount of signaling information these fields are able to convey. In any case, after applying the increased gain to a certain field or fields in header 52 and/or header 54 of frame 50, the communication control logic will typically reduce the gain applied by transceivers 38 in transmitting payload 56 to its nominal, legacy level, in order to avoid excessive power consumption and interference with other transmitters.

FIGS. 3A and 3B are block diagrams that schematically illustrate data frames 78 and 84, respectively, which are transmitted over a wireless channel in accordance with further embodiments of the invention. These embodiments assume that NGV transceivers 38 are capable of communicating over a bandwidth that is at least twice the bandwidth of legacy, IEEE 802.11p transceivers. Specifically, in the pictured example, transceivers 38 are assumed to support a modulation bandwidth of at least 20 MHz, in contrast to the nominal 10 MHz bandwidth of legacy, IEEE 802.11p transceivers. When STA 22 communicates with legacy stations (including both mobile and stationary stations, such as access points), the communication control logic in STA 22 will control transceivers 38 so that they modulate the header and payload data symbols only over this nominal, reduced bandwidth.

To ensure backward-compatibility with legacy transceivers even when transmitting NGV data frames, such as frames 78 and 84, the communication control logic in station 22 inserts legacy frame headers 80a and 80b in these frames in a format that is compatible with the 802.11p standard. Consequently, transceivers 38 transmit each of headers 80a and 80b within the nominal, 10 MHz bandwidth that is supported by legacy transceivers. Specifically, the fields in legacy headers 80a and 80b (including LSTF 58, LLTF 60 and LSIG 62, as shown in FIG. 2) are transmitted in parallel over two 10 MHz sub-bands of the overall 20 MHz bandwidth. Legacy receivers will thus be able to demodulate and decode headers 80a and 80b. Headers 80a and 80b may also include VSIG 64 and possibly other fields of NGV PHY header 54, as described above.

Following legacy headers 80a and 80b in NGV frames 78 and 84, STA 22 makes use of the full, 20 MHz bandwidth in transmitting a frame payload 82. FIGS. 3A and 3B show two different options of using the full 20 MHz bandwidth for modulation of payload 82:

In frame 78, transceivers 38 are driven to modulate the data symbols in payload 82 over the entire enhanced communication bandwidth, i.e., using OFDM tones extending over a 20 MHz range in the present example.

In frame 84, on the other hand, the communication control logic divides the data in payload 82 into two different sets of symbols 86a and 86b, and drives transceivers 38 to modulate the two sets of symbols separately over two sub-bands, corresponding to the 10 MHz sub-bands of headers 80a and 80b. In this case, the OFDM tone plan can be the same as is used in legacy transmission in accordance with IEEE 802.11p. Transceivers 38 filter the two signals corresponding to the two sets of symbols 86a and 86b separately, typically with a gap between the corresponding signal masks (as illustrated by the horizontal gap in FIG. 3B).

Figure 4:
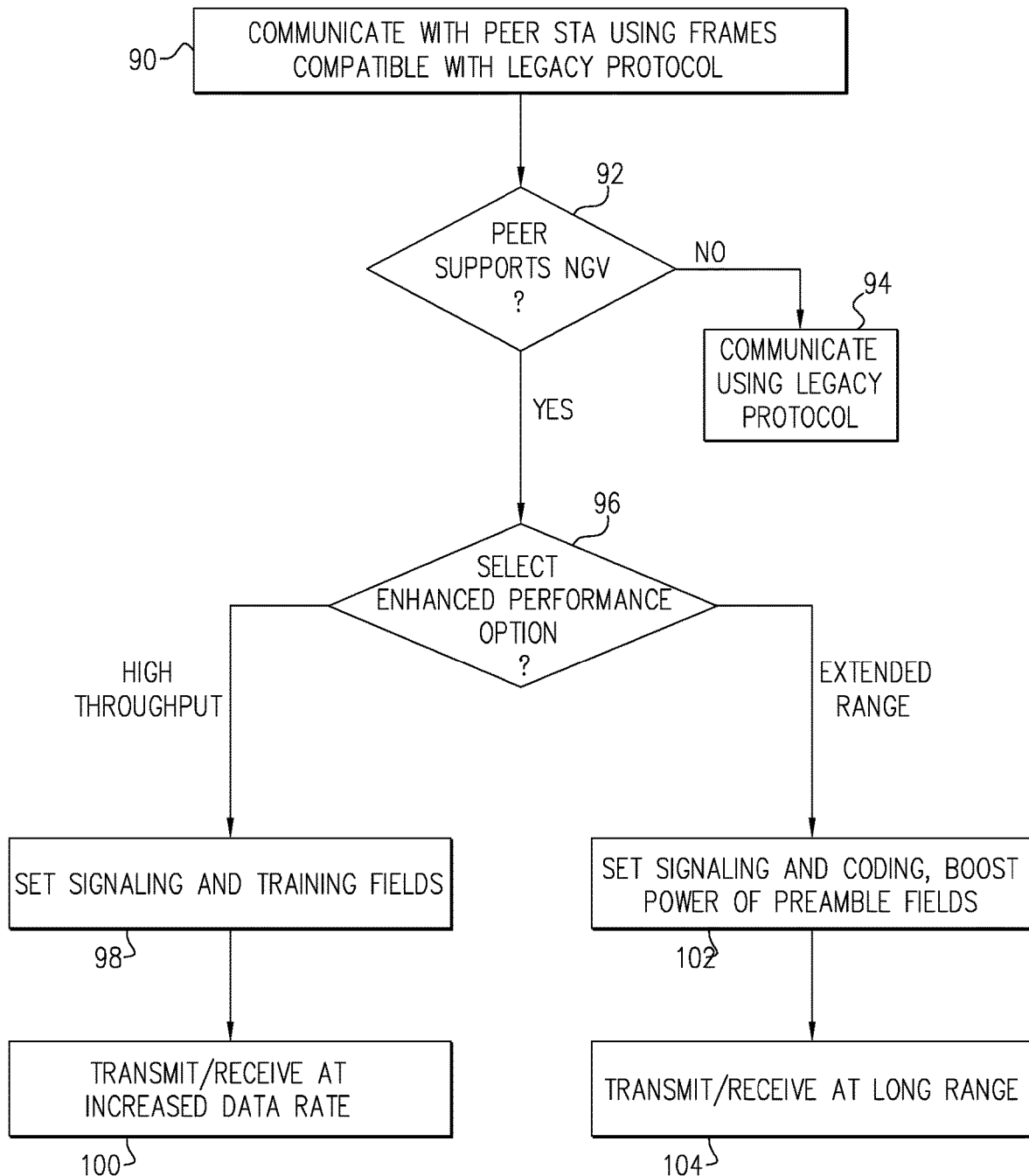
FIG. 4 is a flow chart that schematically illustrates a method for communication, in accordance with an embodiment of the invention.

FIG. 4 is a flow chart that schematically illustrates a method for communication, in accordance with an embodiment of the invention. This method is described hereinbelow, for the sake of clarity and concreteness, with reference to the components of system 20 that are shown in FIG. 1; but the principles of this method may similarly be applied in other operating environments.

An NGV-compatible station, for example STA 22, initiates communication with a peer station, such as STA 26, at an initiation step 90. At this stage, STA 22 has not yet determined whether STA 26 is also NGV-compatible or whether it is a legacy station. Therefore, STA 22 transmits frames to STA 26 with a format and contents that are compatible with the legacy protocol, such as IEEE 802.11p. STA 22 and STA 26 exchange signaling frames at this stage in order to identify their respective capabilities, thus enabling STA 22 to determine whether or not STA 26 supports an NGV protocol, such as IEEE 802.11bd, at a support identification step 92. If not, STA 22 continues communicating with STA 26 using only the legacy protocol, at a legacy communication step 94.

At this stage, all fields in the legacy protocol headers may be transmitted either at the at regular gain levels used by legacy, IEEE 802.11p stations, or certain fields may be transmitted with boosted gain, as noted above. For example, the use of increased gain at this stage facilitates discovery of peer devices at distances that are too great for legacy operation but may be supported by the extended range option. If only legacy devices are detected, the lower gain may be used in subsequent communications.

Upon determining that STA 26 supports NGV at step 92, host processor 42 in STA 22 may select an enhanced NGV performance option, at an enhancement selection step 96. These options include, in the present embodiment, extended throughput and extended range, although other options may be supported in a similar manner. For example, extended throughput may be selected if an application running on host processor 42 of STA 22 needs to send and/or receive a large volume of data from STA 26; whereas extended range may be selected, for example, when host processor 42 determines that STA 22 is traveling in high-speed traffic, in which the time available for communication over the legacy communication range is inadequate. If the extended throughput option is selected, host processor 42 instructs PHY interface 34 to set the signaling and training fields to the appropriate values for this option, at a throughput signaling step 98. For example, in frame 50 (FIG. 2), the entries in VSIG 64 and VLTF 66 are set to the appropriate values for throughput enhancement, as explained above. Typically, STA 26 will respond with similar signaling. STA 22 and STA 26 can then exchange data frames at the increased data rate and possibly increased bandwidth, at a high-throughput data exchange step 100.

Alternatively, if host processor 42 in STA 26 selects the extended range option at step 96, it then instruct PHY interface 34 to set the signaling and training fields to the appropriate values for extending the range of communications, at a range signaling step 102. A lower coding rate may be indicated in this case, to handle communications over long distances. Furthermore, as explained above, the power of the training fields, such as LLTF 60 and/or VLTF 66 may be boosted to enable better channel estimation over long distances. As in the case of extended throughput, STA 26 will respond with similar signaling. STA 22 and STA 26 can then exchange data frames over an increased range, at a long-range data exchange step 104.

It is noted in view of the foregoing that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a transceiver configured to transmit and receive signals over a wireless channel in accordance with both a first communication protocol and a second communication protocol, the first communication protocol defining a nominal communication bandwidth, the second communication protocol being backward-compatible with the first communication protocol while defining an enhanced communication bandwidth, which is at least twice the nominal communication bandwidth; and
a communication controller, which is configured to generate data frames for transmission by the transceiver, including frame headers in a header format that is compatible with both the first communication protocol and the second communication protocol, such that the frame headers are transmitted within the nominal communication bandwidth, and the data frames that are transmitted in accordance with the second communication protocol have first and second frame headers that are transmitted in parallel in respective first and second sub-bands of the enhanced communication bandwidth.

2. The apparatus according to claim 1, wherein the data frames comprise payloads comprising data symbols, and wherein the communication controller is configured to cause the transceiver to modulate the data symbols over the nominal communication bandwidth in the data frames that are transmitted in accordance with the first communication protocol, and to modulate the symbols over the enhanced communication bandwidth in the data frames that are transmitted in accordance with the second communication protocol.

3. The apparatus according to claim 1, wherein the data frames comprise payloads comprising data symbols, and wherein the communication controller is configured to cause the transceiver to modulate the data symbols over the nominal communication bandwidth in the data frames that are transmitted in accordance with the first communication protocol, and to cause the transceiver to modulate first symbols in the payloads over the first sub-band and second symbols in the payloads, different from the first symbols, over the second sub-band in the data frames that are transmitted in accordance with the second communication protocol.

4. The apparatus according to claim 1, wherein the transceiver is configured to transmit and receive the signals over the wireless channel in accordance with both an IEEE 802.11p protocol and an IEEE 802.11bd protocol.

5. A method for communication, comprising:
providing a transceiver that is capable of transmitting and receiving signals over a wireless channel in accordance with both a first communication protocol and a second communication protocol, the first communication protocol defining a nominal communication bandwidth, the second communication protocol being backward-compatible with the first communication protocol while defining an enhanced communication bandwidth, which is at least twice the nominal communication bandwidth;

generating data frames for transmission by the transceiver, including frame headers in a header format that is compatible with both the first communication protocol and the second communication protocol, such that the frame headers are transmitted within the nominal communication bandwidth; and in the data frames that are transmitted in accordance with the second communication protocol, transmitting first and second frame headers in parallel in respective first and second sub-bands of the enhanced communication bandwidth.

6. The method according to claim 5, wherein the data frames comprise payloads comprising data symbols, and wherein generating the data frame comprises configuring the transceiver to modulate the data symbols over the nominal communication bandwidth in the data frames that are transmitted in accordance with the first communication protocol, and to modulate the symbols over the enhanced communication bandwidth in the data frames that are transmitted in accordance with the second communication protocol.

7. The method according to claim 5, wherein the data frames comprise payloads comprising data symbols, and wherein generating the data frames comprises configuring the transceiver to modulate the data symbols over the nominal communication bandwidth in the data frames that are transmitted in accordance with the first communication protocol, and to modulate first symbols in the payloads over the first sub-band and second symbols in the payloads, different from the first symbols, over the second sub-band in the data frames that are transmitted in accordance with the second communication protocol.

8. The method according to claim 5, wherein providing the transceiver comprises configuring the transceiver to transmit and receive the signals over the wireless channel is accordance with both an IEEE 802.11p protocol and an IEEE 802.11bd protocol.

* * * * *